(12) United States Patent
Fan

(10) Patent No.: US 7,363,998 B2
(45) Date of Patent: Apr. 29, 2008

(54) WALK-SUBSTITUTING CART CHASSIS STRUCTURE

(76) Inventor: Ju-Yu Fan, 2F, No. 16, Lane 27, Shui Yuan Road, Chung Chen District, Taipei (TW)

( * ) Notice: Subject to any disclaimer, the term of this patent is extended or adjusted under 35 U.S.C. 154(b) by 244 days.

(21) Appl. No.: 11/295,571

(22) Filed: Dec. 7, 2005

(65) Prior Publication Data

US 2007/0125583 A1    Jun. 7, 2007

(51) Int. Cl.
*B62D 41/00* (2006.01)
(52) U.S. Cl. .................................. 180/208
(58) Field of Classification Search ............... 180/208, 180/59, 60, 65.1, 210, 311, 907, 908; 280/124.109
See application file for complete search history.

(56) References Cited

U.S. PATENT DOCUMENTS 5,941,327 A * 8/1999 Wu ........................... 180/65.1
6,170,592 B1 * 1/2001 Wu ........................... 180/208
7,028,799 B2 * 4/2006 Lin ........................... 180/208
7,044,249 B2 * 5/2006 Fan ........................... 180/208
7,059,441 B2 * 6/2006 Chen ......................... 180/208

* cited by examiner

*Primary Examiner*—Faye M. Fleming
(74) *Attorney, Agent, or Firm*—Rosenberg, Klein & Lee

(57) ABSTRACT

A walk-substituting cart includes a front chassis, and a rear chassis; the front chassis has an upright tube, insulating plates on the rear, and an engaging plate, which is secured behind the upright tube, and has a hole; the rear chassis has an upright rod, insulating plates on the front, and a fixing mechanism positioned on top of the upright rod; the fixing mechanism has a spring-biased fixing rod, which will snap into the hole of the engaging plate when the front and the rear chassis are coupled; each insulating plate has a powerful magnet and contacting terminals secured thereon; when the front and the rear chassis are coupled, each of the magnets will attract the corresponding magnets, and each of the contacting terminals will closely touch the corresponding terminals so as to electrically connect the power supply unit to the actuating motor of the cart.

8 Claims, 10 Drawing Sheets

WALK-SUBSTITUTING CART CHASSIS STRUCTURE

BACKGROUND OF THE INVENTION

1. Field of the Invention

The present invention relates to a chassis of a walk-substituting cart, more particularly one, which includes front and rear chassis, and is easy and rapid to assemble, and whose terminals will automatically come into contact in order to electrically connect the power supply unit to the actuating motor as soon as the front and the rear chassis are coupled.

2. Brief Description of the Prior Art

Referring to FIGS. 9 and 10, U.S. Pat. No. 6,439,331 teaches a "CHASSIS OF AN ELECTRIC WALK-SUBSTITUTING CAR", which was invented by the inventor of the present invention, and whose filing date and application number are Aug. 21, 2000, and Ser. No. 09/641,938 respectively. The chassis of an electric walk-substituting car includes a front chassis 91, a middle chassis 92, and a rear chassis 93 joined together. The front chassis 91 has a vertical connect rod 911 provided at a rear side and a fix rod 912 fixed laterally under the lower end of the vertical connect rod 911, which has two ends respectively connected to a support rod 913 extending lengthwise forward. Further, the connect rod 911 has an inverted U-shape combine plate 914 fixed on its upper rear side, and a chair is combined on the upper end of the connect rod 911. The inverted U-shape combine plate 914 has opposed connecting holes 9141 on two lateral sides thereof.

The middle chassis 92 has a vertical combine rod 921 and a lateral rod 922 located under the combine rod 921. The lateral rod 922 has an L-shaped plate 923 respectively at two sides in front of the lateral rod 922. Each L-shaped plate 923 has a vertical portion 9231 defining an insert aperture 924 with the lateral rod 922 for the fix rod 912 of the front chassis 91 to fit therein. A pivot connector 925 is respectively fixed at two sides of the rear wall of the lateral rod 922. A lateral elongate strip 926 is provided at the rear side of the middle chassis 92, and a combine means 927 respectively fixed at two ends of the strip 926. The vertical combine rod 921 has a through hole 9211 at an upper end thereof.

The rear chassis 93 has a side rod 931 respectively extending lengthwise parallel at two sides, and each side rod 931 has a pivot hole 932 formed in a front side to be pivotally connected to each pivot connector 925 of the middle chassis 92, a connect means 933 respectively fixed on an outer side of each side rod 931 and aligned to each other to be connected to each combine means 927 of the middle chassis 92 with a bolt and nut 934 fitted around by a coil spring 935.

A power-supply unit is positioned on a rear end of the front chassis 91, and connected to cords 94 having a connecting element 941 connected thereto. And, an actuating motor is positioned on the rear chassis 93, and connected to cords 95 having a connecting element 951 connected thereto; thus, the power-supply unit can be electrically connected to the actuating motor by means of connecting the connecting elements 941 and 951.

In assembling, firstly, the fix rod 912 of the front chassis 91 is inserted in the inert aperture 924 of the middle chassis 92, then the upper end of the combine rod 921 is inserted in the combine plate 914 on the upper end of the connect rod 911. And, a screw button 915 is passed through the holes 9141 of the combine plate 914 and the through holes 9211 of the combine rod 921 to join the front chassis 5 and the middle chassis 6. Next, the pivot holes 932 of the two side rods 931 of the rear chassis 93 are fitted in the two pivot connectors 925 and two pivots are respectably inserted through the pivot holes 932 and the pivot connectors 925 so that the two side rods 931 and the rod 922 are pivotally connected to each other. Lastly, insert the bolts 934 through the combine means 927 and the two connect means 933 of the side rods 931 of the rear chassis 93 and screw the bolts 934 with the nuts, with two coil springs 935 respectively fitted around the two bolts 934, which coil springs 935 will produce elasticity to absorb vibration as to make the car comfortable to ride on.

The above electric walk-substituting car is found to have the following disadvantages:

1. It takes relatively much time to join the front and the middle chassis because the user has to take the trouble to pass a threaded fixing element through the holes of both the inverted U-shape combine plate and the vertical combine rod in order to secure the front chassis to the middle one after the front and the middle chassis are positioned together with the vertical connect rod abutting the vertical combine rod.

2. After the chassis is assembled, the user has to take the trouble to connect the connecting elements of the power-supply unit to those of the actuating motor in order to electrically connect the power-supply unit to the actuating motor. Therefore, the chassis isn't convenient to use.

SUMMARY OF THE INVENTION

It is a main object of the invention to provide an improvement on a chassis of a walk-substituting cart to overcome the above-mentioned problems. The chassis of the present invention includes a front chassis, and a rear chassis. The front chassis has an upright tube, insulating plates on the rear, and an engaging plate, which is secured behind the upright tube, and which has an engaging hole. The rear chassis has an upright rod, insulating plates on the front, and a fixing mechanism positioned on top of the upright rod. The fixing mechanism has a spring-biased fixing rod, which will snap into the engaging hole of the engaging plate when the front and the rear chassis are coupled. The engaging plate has an upper sloping side, which will be pressed against a lower end of the spring-biased fixing rod when the front chassis is pivoted on the rear chassis in assembly. Each of the insulating plates has a powerful magnet and two contacting terminals secured thereon. When the front and the rear chassis are coupled, each of the magnets will attract the corresponding magnets, and each of the contacting terminals will closely touch the corresponding terminals so as to electrically connect the power supply unit to the actuating motor of the cart.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
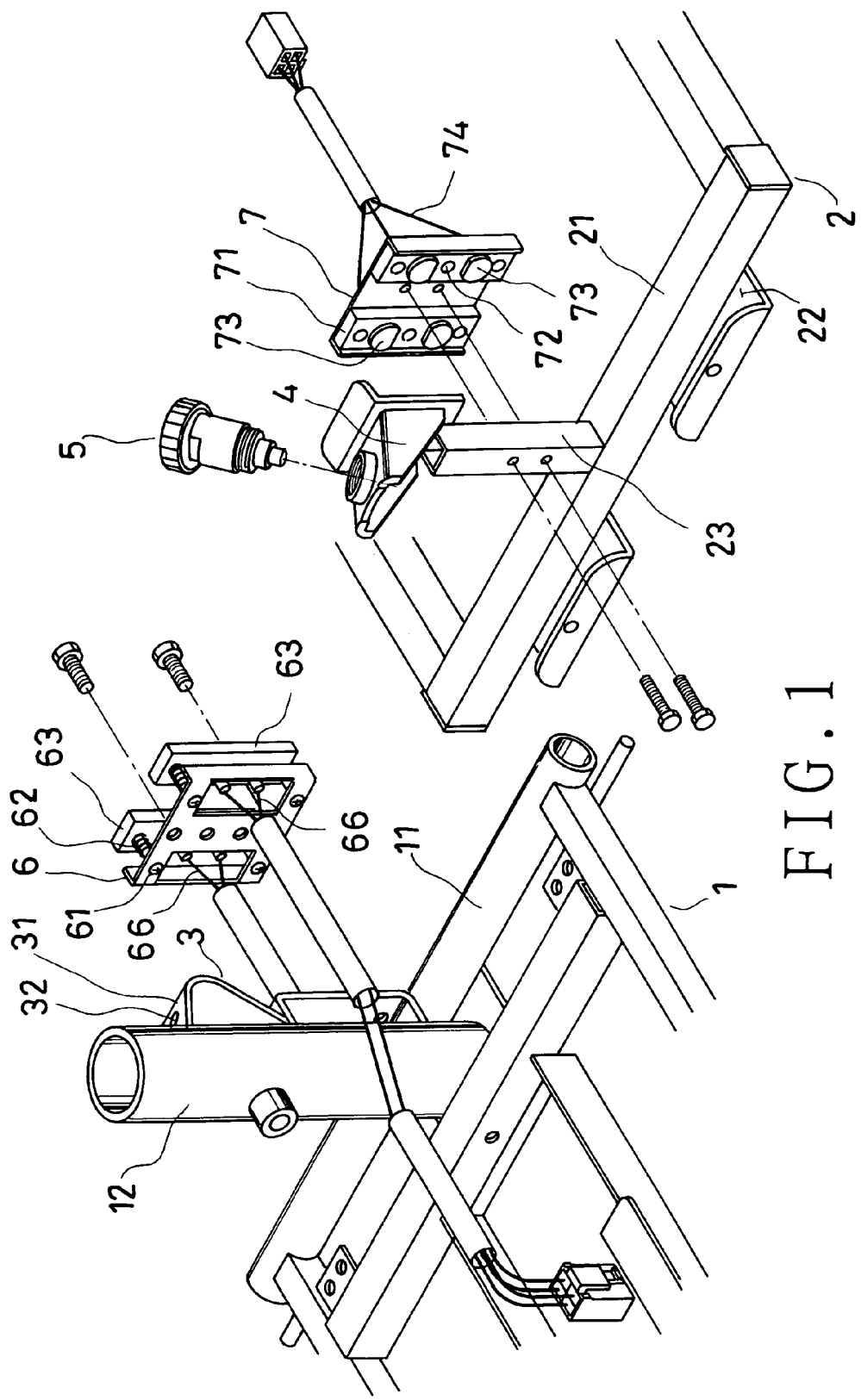
FIG. 1 is an exploded perspective view of the chassis of a walk-substituting cart in the present invention.
Figure 2:
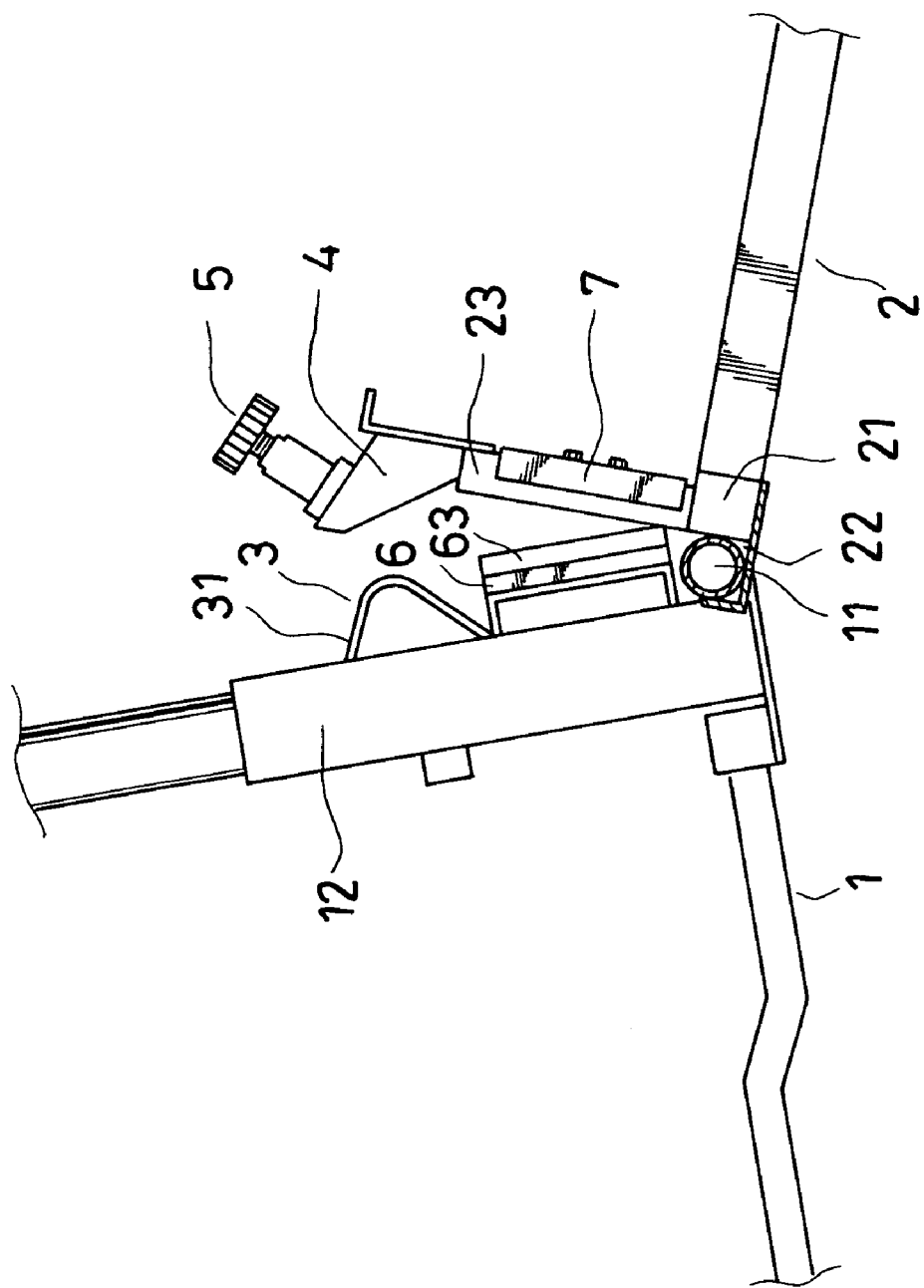
FIG. 2 is a side view of the chassis in a first step of its assembling process.
Figure 3:
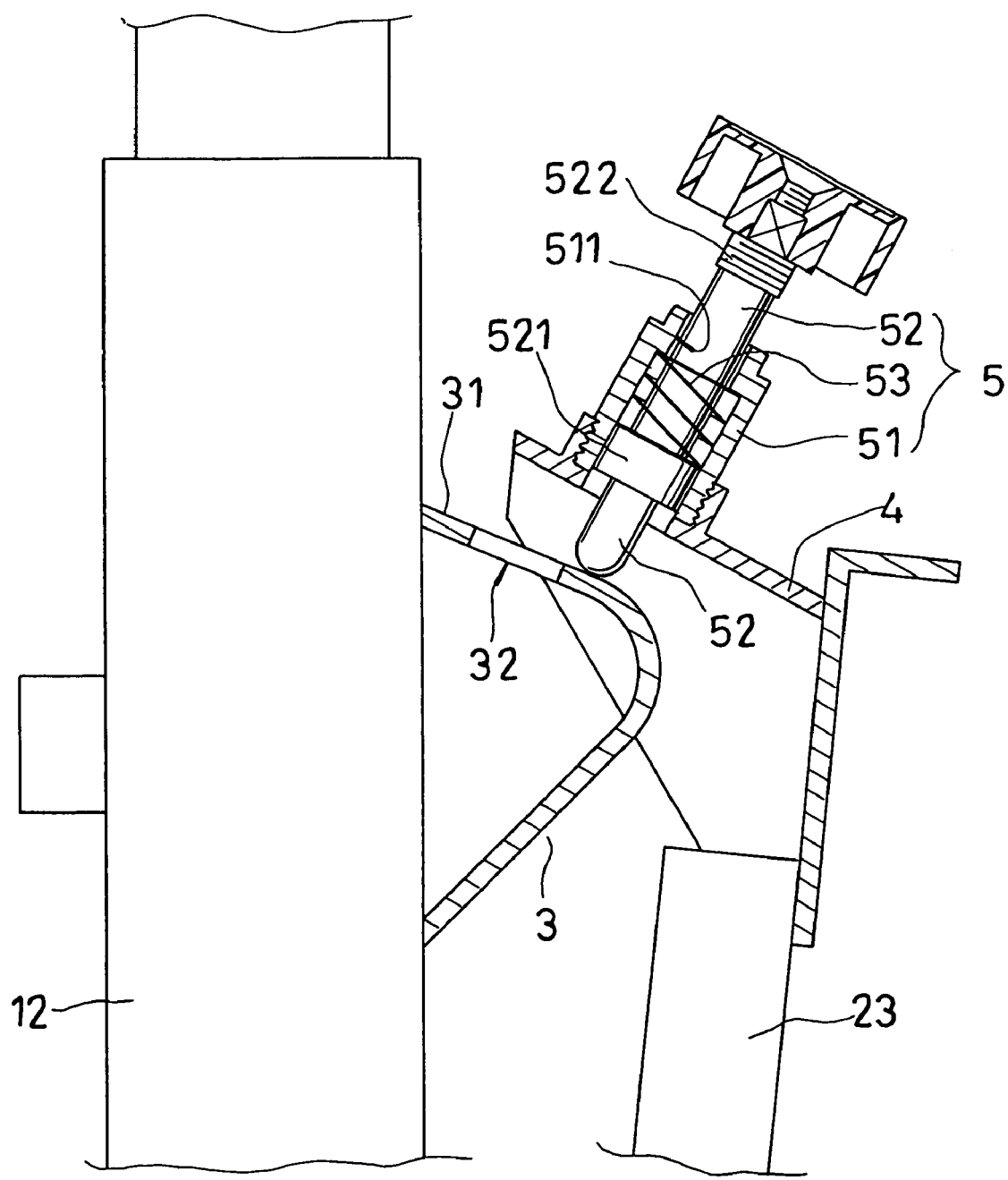
FIG. 3 is a partial sectional view of the chassis in a second step of its assembling process.
Figure 4:
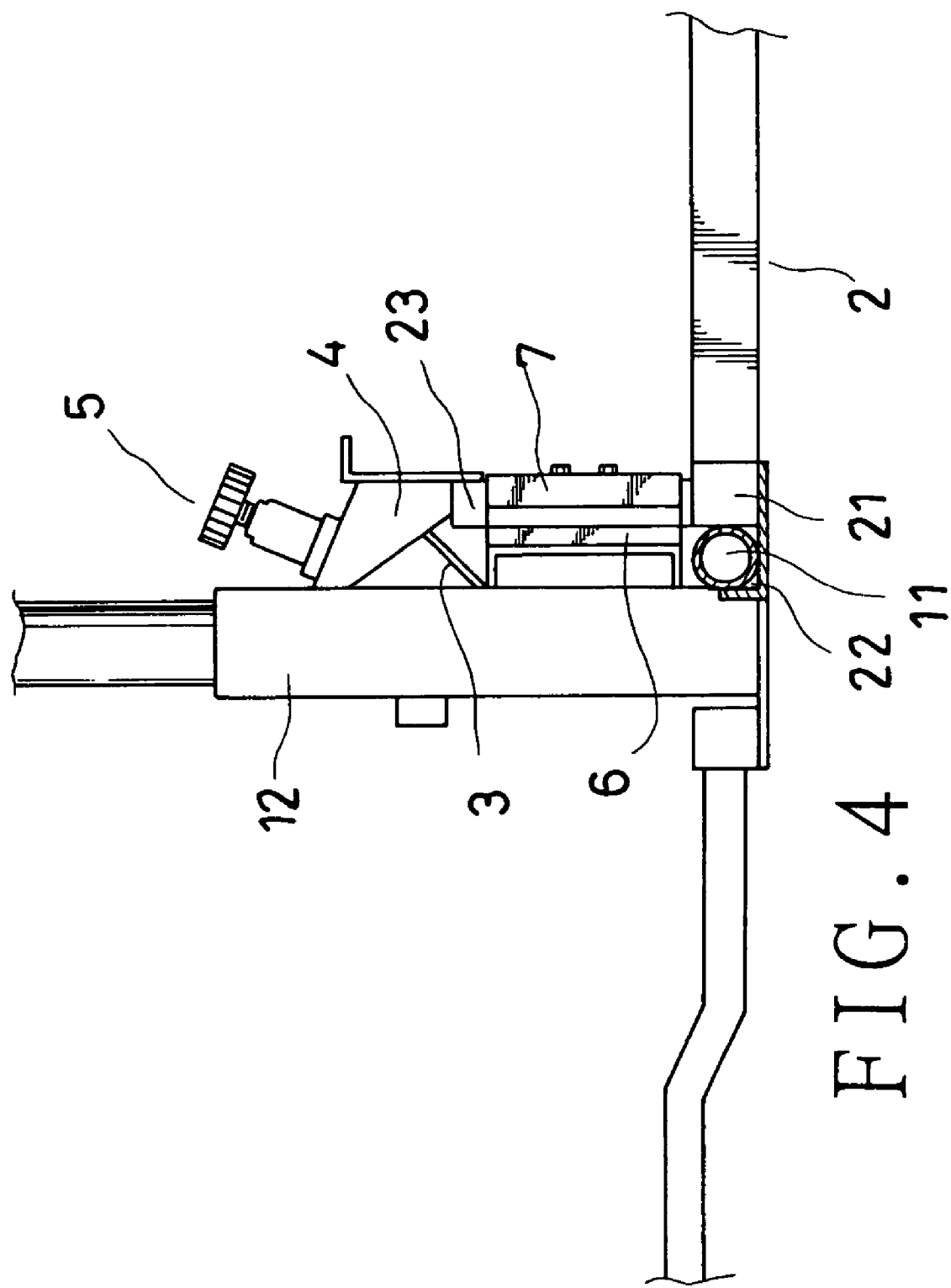
FIG. 4 is a side view of the chassis after assembly.
Figure 5:
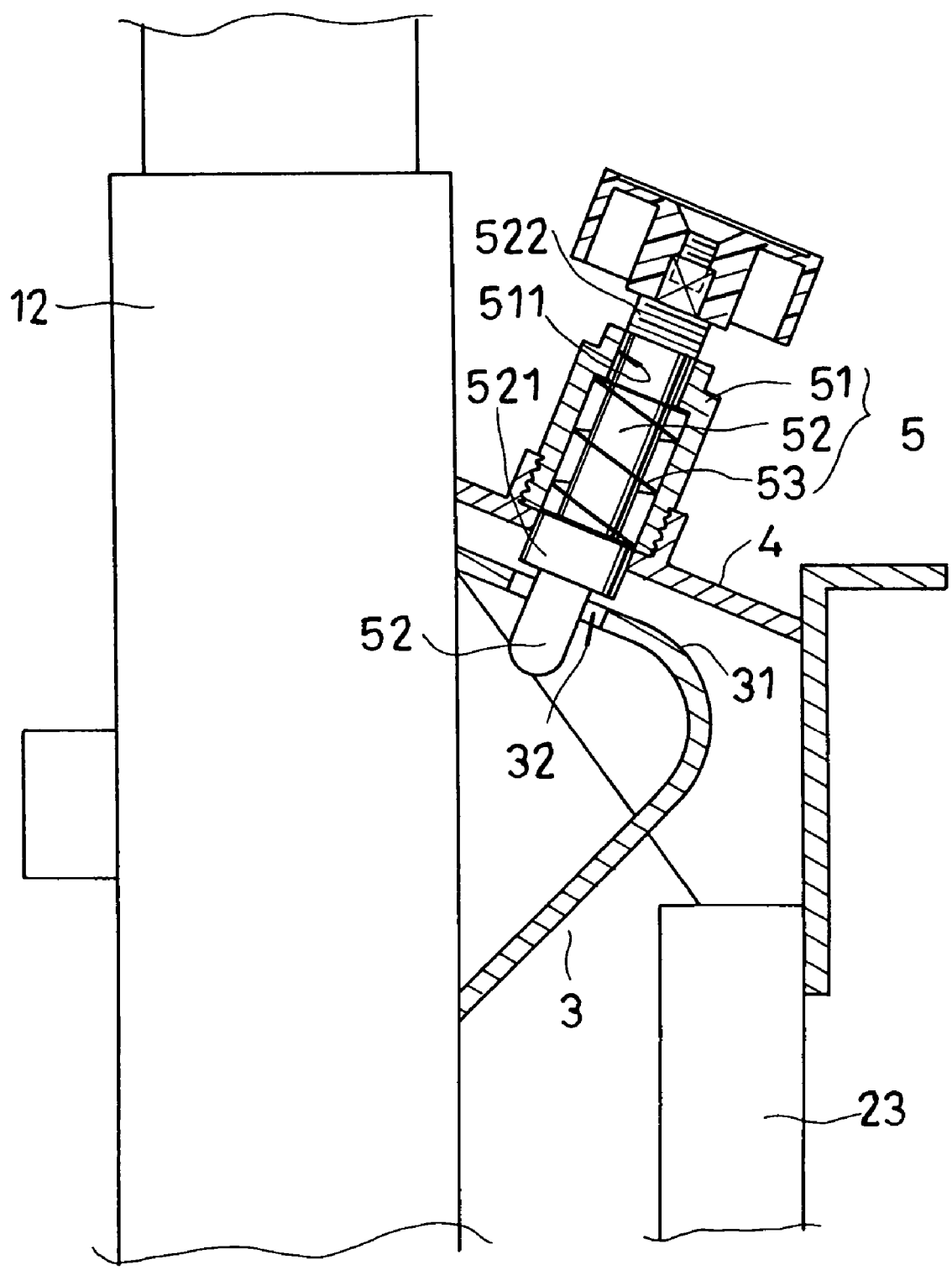
FIG. 5 is a partial sectional view of the chassis after assembly.
Figure 6:
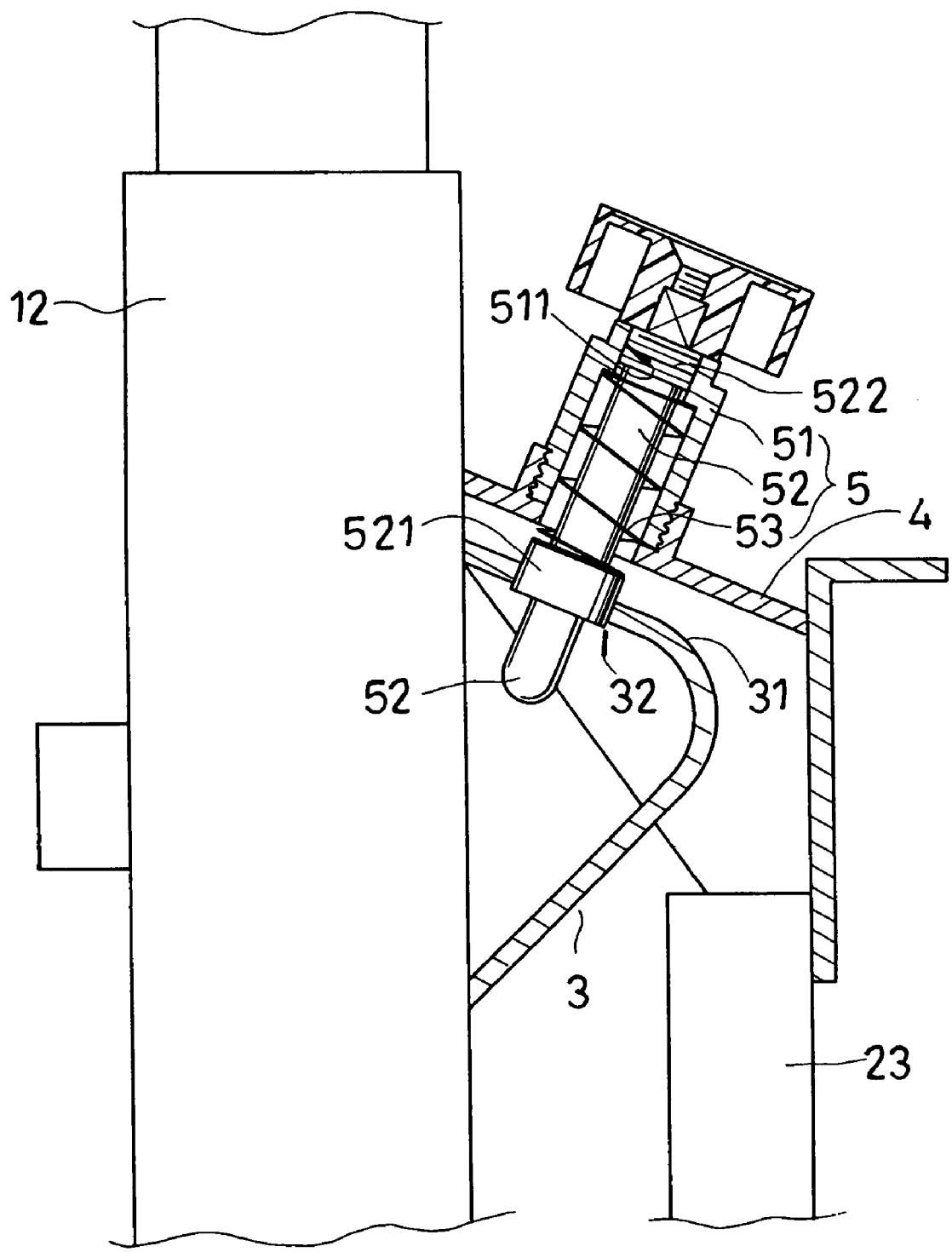
FIG. 6 is a sectional view of the fixing mechanism securing the front chassis to the rear chassis.
Figure 7:
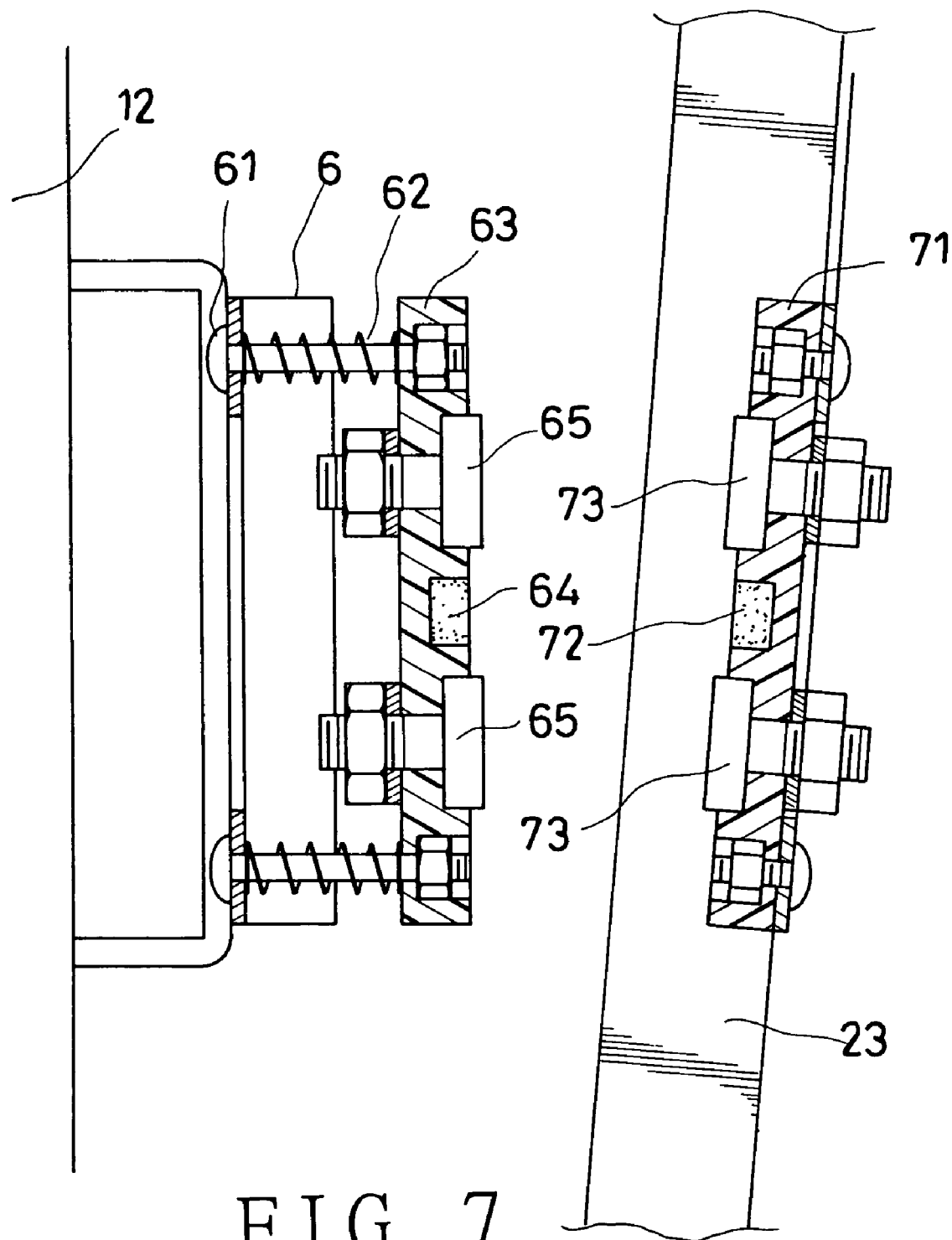
FIG. 7 is a partial sectional view of the chassis in assembly.
Figure 8:
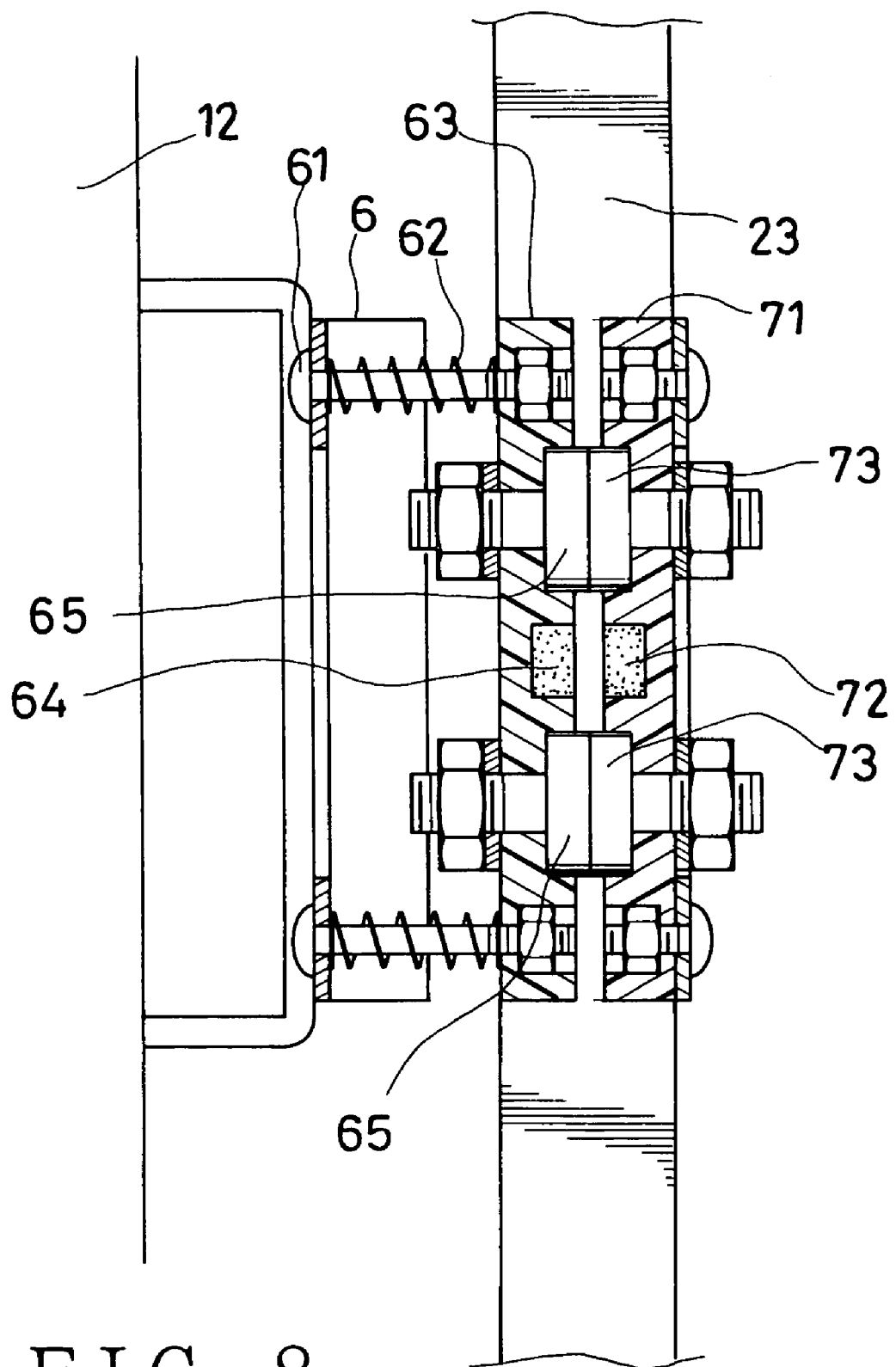
FIG. 8 is a partial sectional view of the chassis after assembly.
Figure 9:
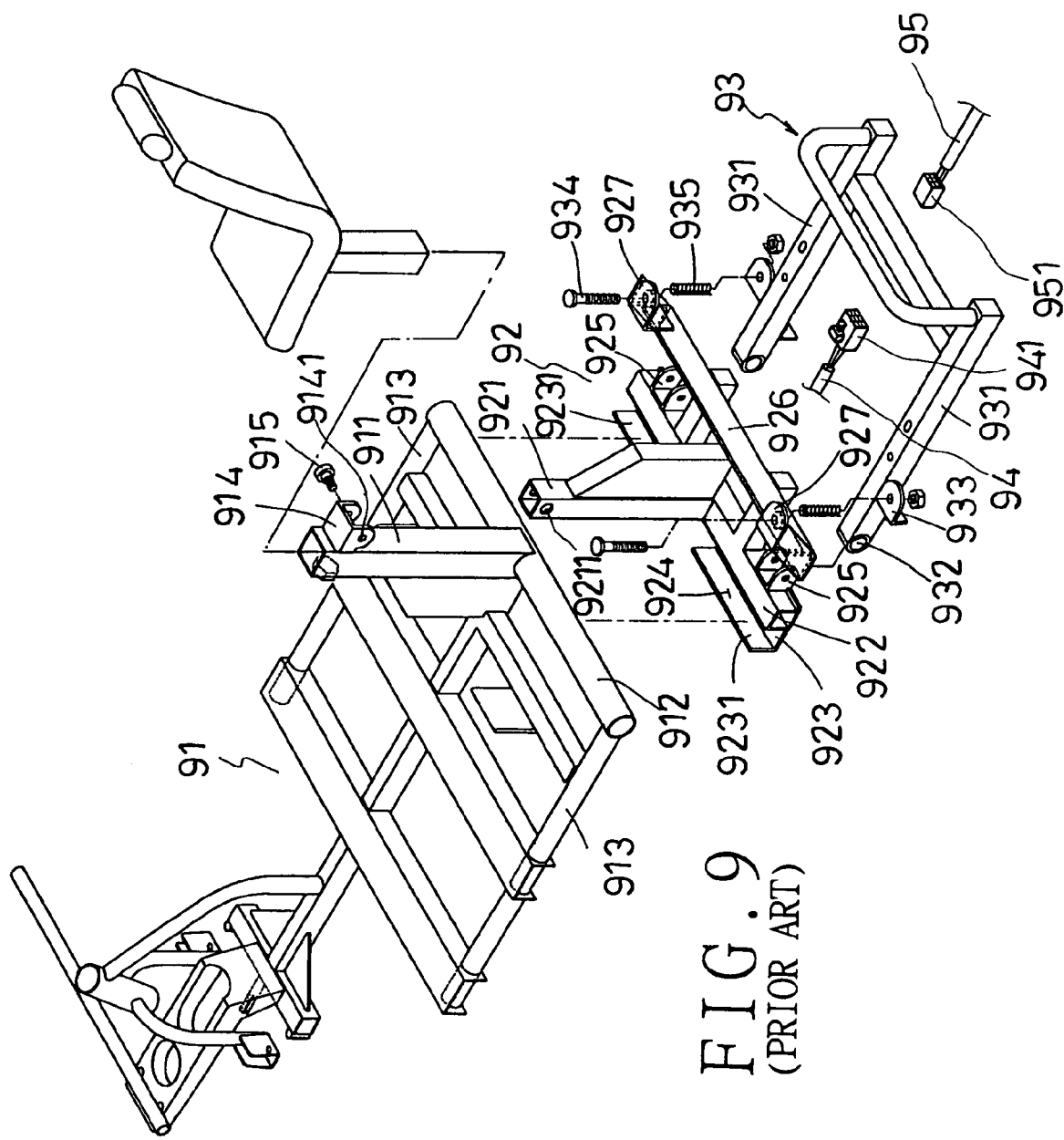
FIG. 9 is an exploded perspective view of the currently existing chassis of a walk-substituting cart.
Figure 10:
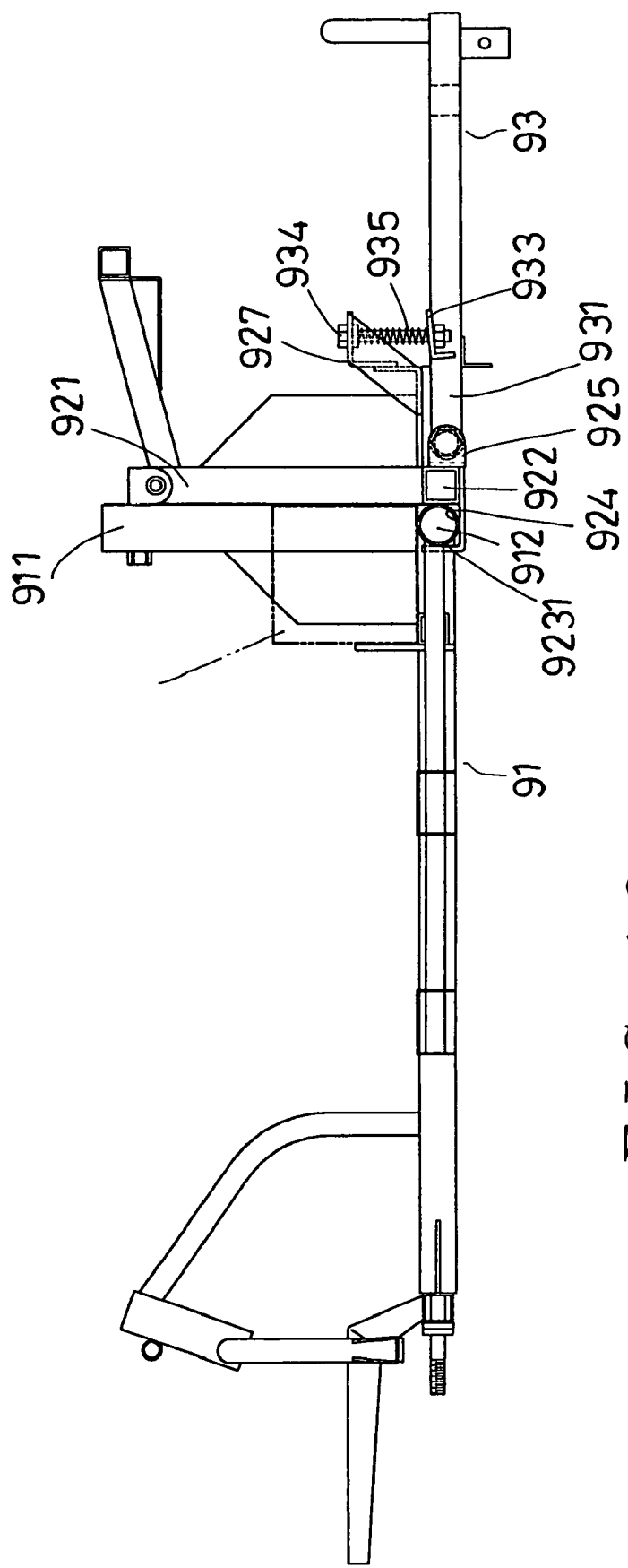
FIG. 10 is a side view of the currently existing chassis.

Referring to FIGS. 1 to 8, a preferred embodiment of a chassis of a walk-substituting cart in the present invention includes a front chassis 1, and a rear chassis, which walk-substituting cart can be an electric cart for use by one person or an electric wheelchair.

The front chassis 1 has a transverse rod 11 at a rear end thereof, an upright tube 12 secured next to a middle of the transverse rod 11, an engaging plate 3 secured on a rear side of the upright tube 12, and a front coupling part 6 secured to the rear side of the upright tube 12. The engaging plate 3 has a "<" shape, and it has an upper side 31 sloping down towards the rear. The upper sloping side 31 of the engaging plate 3 has an engaging hole 31 thereon.

Two front insulating plates 63 are positioned right behind and connected to the front coupling part 6 by means of threaded fixing elements 61, each of which is passed through a coiled spring 62, and connected to the front coupling part 6 and a corresponding front insulating plate 63 at two ends thereof such that the front insulating plate 63 is linearly movable relative to the threaded fixing elements 61; thus, the front insulating plates 63 are biased rearwards by the coiled springs 62. Each of the front insulating plates 63 has a front powerful magnet 64 secured on a middle of a rear side thereof, and two front contacting terminals 65 secured on the rear side thereof, which are above and under the front powerful magnet 64 respectively. Wires 66 are connected to the front contacting terminals 65 and a power supply unit.

The rear chassis 2 has a transverse support rod 21 at a front end thereof, a fitting space 22 next to a front side of the transverse support rod 21, a supporting rod 23 projecting upwards from a middle of the transverse support rod 21, a connecting/member 4 secured on an upper end of the supporting rod 23, a fixing member 5 joined to the connecting member 4, and a rear coupling part 7 secured to a front side of the supporting rod 23. The connecting member 4 has an upper side, which slopes up towards the front.

The fixing mechanism 5 includes:

a supporting sleeve 51 securely joined to the upper side of the connecting member 4 at a lower end thereof; the supporting sleeve 51 has interior screw threads 511 near to one end thereof;

a fixing rod 52 passed through the supporting sleeve 51; the fixing rod 52 having an annular protrusion 521 thereon, exterior screw threads 522 on one end thereof, and an upper grip end sticking out from the supporting sleeve 51 for allowing a person to hold and pull; and a spring 53 positioned in the supporting sleeve 51 and around an intermediate portion of the fixing rod 52; one end of the spring 53 touches an inner side of the annular protrusion 521 of the fixing rod 52 to bias the fixing rod 52 downwards, thus making the fixing rod 52 stick out from a lower end of the supporting sleeve 51.

Two rear insulating plates 71 are secured on a front side of the rear coupling part 7. Each of the rear insulating plates 71 has a rear powerful magnet 72 secured on a middle of a front side thereof, and two rear contacting terminals 73 secured on the front side thereof, which are above and under the rear powerful magnet 72 respectively. Wires 74 are connected to the rear contacting terminals 73 and an actuating motor. Or alternatively, the rear insulating plates 71 can be positioned right in front of and connected to the rear coupling part 7 by means of threaded fixing elements, each of which is passed through a coiled spring, and connected to the rear coupling part 7 and a corresponding rear insulating plate 71 at two ends thereof such that the rear insulating plate 71 is linearly movable relative to the threaded fixing elements.

In assembling the chassis, first the transverse rod 11 of the front chassis 1 is fitted in the fitting space 22 of the rear chassis 2, and next the front chassis 1 is pivoted on the rear chassis 2 until the upright tube 12 is in the upright position; thus, the engaging plate 3 is held in the connecting member 4, and the fixing rod 52 of the fixing mechanism 5 projects through the engaging hole 32 to engage the engaging plate 3, and the front insulating plates 63 exactly facing the corresponding rear insulating plates 71 with the front powerful magnets 64 attracting corresponding rear powerful magnets 72; while the front chassis 1 is being pivoted relative to the rear chassis 2, the upper side of the engaging plate 3 will be pressed against and move relative to the lower end of the fixing rod 52; the spring 53 will make the fixing rod 52 pass through the engaging hole 32 as soon as the engaging hole 32 faces the lower end of the fixing rod 52. Consequently, the front contacting terminals 65 touch the corresponding rear contacting terminals 73 closely to electrically connect the power supply unit to the actuating motor. The fixing rod 52 should be turned relative to the supporting sleeve 51 for the exterior screw threads 522 to engage the interior screw threads 511 after the fixing rod 52 projects through the engaging hole 32; thus, the front and the rear chassis 1 and 2 are joined together, and the fixing rod 52 is prevented from moving relative to the supporting sleeve 51.

From the above description, it can be easily seen that the walk-substituting cart chassis of the present invention has the following advantages:

1. The chassis is easy and rapid to assemble because a person only has to fit the transverse rod of the front chassis into the fitting space of the rear chassis, and pivot the front chassis relative to the rear chassis until the fixing rod snaps into the engaging hole of the engaging plate.

2. After the chassis is assembled, the front contacting terminals will certainly closely touch the corresponding rear contacting terminals to electrically connect the power supply unit to the actuating motor because of the powerful magnets secured on the insulating plates and the coiled springs biasing the front insulating plates rearwards. Therefore, the user can save the trouble of manually connecting the power supply unit to the actuating motor after the chassis is assembled.

What is claimed is:

1. An improvement on a chassis structure of a walk-substituting cart, comprising a front chassis having a transverse rod at a rear end thereof, and an upright tube secured next to a middle of the transverse rod;

a rear chassis having a transverse support rod at a front end thereof, a fitting space next to a front side of the transverse support rod thereof, and a supporting rod projecting upwards from a middle of the transverse support rod;

an engaging plate secured on a rear side of the upright tube; the engaging plate having an upper side sloping down towards a rear; the engaging plate having an engaging hole thereon;

a front coupling part secured on a rear side of the upright tube;

a rear coupling part secured on a front side of the supporting rod on the rear chassis;

a plurality of front insulating plates positioned right behind and connected to the front coupling part; each of the front insulating plates having a front powerful magnet secured on a middle of a rear side thereof; each of the front insulating plates having a plurality of front contacting terminals secured on the rear side thereof; wires being connected to the front contacting terminals and a power supply unit;

a plurality of rear insulating plates positioned right in front of and connected to the rear coupling part; each of the rear insulating plates having a rear powerful magnet secured on a middle of a front side thereof; each of the rear insulating plates having a plurality of rear contacting terminals secured on the front side thereof; wires being connected to the rear contacting terminals and an actuating motor;

a connecting member secured on an upper end of the supporting rod on the rear chassis; the connecting member sloping up towards a front; and a fixing mechanism joined to the connecting member; when the front chassis is pivoted on the rear chassis with the transverse rod of the front chassis being held in the fitting space of the rear chassis, the fixing mechanism being going to pass through the engaging hole so as to engage the engaging plate, thus fastening the front and the rear chassis together;

after the front and the rear chassis are coupled, the front insulating plates being going to exactly face corresponding rear insulating plates with the front powerful magnets attracting corresponding rear powerful magnets, and with the front contacting terminals closely touching corresponding rear contacting terminals to electrically connect the power supply unit to the actuating motor.

2. The chassis structure of a walk-substituting cart as claimed in claim 1, wherein the engaging plate is V-shaped.

3. The chassis structure of a walk-substituting cart as claimed in claim 1, wherein fixing mechanism includes:

a supporting sleeve secured on the upper side of the connecting member;

a fixing rod passed through the supporting sleeve; the fixing rod having an annular protrusion thereon, and an upper grip end sticking out from the supporting sleeve for allowing a person to hold and pull; and a spring positioned in the supporting sleeve and around an intermediate portion of the fixing rod; one end of the spring touching an inner side of the annular protrusion of the fixing rod so as to bias the fixing rod downwards.

4. The chassis structure of a walk-substituting cart as claimed in claim 3, wherein the supporting sleeve of the fixing mechanism has interior screw threads near to one end thereof, and the fixing rod has exterior screw threads thereon for allowing engagement between the supporting sleeve and the fixing rod.

5. The chassis structure of a walk-substituting cart as claimed in claim 1, wherein the front insulating plates are connected to the front coupling part by means of threaded fixing elements, each of which is passed through a coiled spring, and connected to the front coupling part and a corresponding front insulating plate at two ends thereof.

6. The chassis structure of a walk-substituting cart as claimed in claim 1, wherein the rear insulating plates are connected to the rear coupling part by means of threaded fixing elements, each of which is passed through a coiled spring, and connected to the rear coupling part and a corresponding rear insulating plate at two ends.

7. The chassis structure of a walk-substituting cart as claimed in claim 1, wherein there are two front insulating plates connected to the front coupling part, and two rear insulating plates connected to the rear coupling part.

8. The chassis structure of a walk-substituting cart as claimed in claim 1, wherein each of the front and the rear insulating plates has two contacting terminals secured thereon, which are positioned above and under the corresponding powerful magnet on the insulating plate respectively.

* * * * *